United States Patent
Liu et al.

(10) Patent No.: US 7,113,175 B2
(45) Date of Patent: Sep. 26, 2006

(54) METHODS AND APPARATUS FOR SUPPLYING POWER TO TOUCH INPUT DEVICES IN A TOUCH SENSING SYSTEM

(75) Inventors: Qianjun Liu, Toronto (CA); Denny Jaeger, Oakland, CA (US)

(73) Assignee: Intertact Corporation, Oakland, CA (US)

( * ) Notice: Subject to any disclaimer, the term of this patent is extended or adjusted under 35 U.S.C. 154(b) by 714 days.

(21) Appl. No.: 09/877,622

(22) Filed: Jun. 8, 2001

(65) Prior Publication Data

US 2002/0036621 A1    Mar. 28, 2002

Related U.S. Application Data

(63) Continuation-in-part of application No. 09/670,610, filed on Sep. 26, 2000.

(51) Int. Cl.
 *G09G 5/00*    (2006.01)
(52) U.S. Cl. .................. 345/173; 345/174; 178/18.07; 178/19.03
(58) Field of Classification Search ................ 345/173, 345/174–179, 157; 178/18.01, 18.03–18.08, 178/19.01–19.07
See application file for complete search history.

(56) References Cited

U.S. PATENT DOCUMENTS

| | | | | |
|---|---|---|---|---|
| 4,922,061 A | * | 5/1990 | Meadows et al. | 347/175 |
| 5,557,076 A | * | 9/1996 | Wieczorek et al. | 178/19 |
| 5,635,684 A | * | 6/1997 | Fukuzaki | 178/18.07 |
| 5,670,754 A | * | 9/1997 | Matsushima | 178/18.07 |
| 5,682,019 A | * | 10/1997 | Katsurahira et al. | 178/18.07 |
| 5,706,000 A | * | 1/1998 | Fukuzaki et al. | 341/5 |
| 5,729,251 A | * | 3/1998 | Nakashima | 709/250 |
| 5,792,997 A | * | 8/1998 | Fukuzaki | 178/18 |
| 5,953,438 A | * | 9/1999 | Stevenson et al. | 381/431 |
| 6,002,387 A | * | 12/1999 | Ronkka et al. | 345/157 |
| 6,005,555 A | * | 12/1999 | Katsurahira et al. | 345/174 |
| 6,373,474 B1 | * | 4/2002 | Katabami | 345/173 |
| 6,380,930 B1 | * | 4/2002 | Van Ruymbeke | 345/173 |
| 6,404,416 B1 | * | 6/2002 | Kahn et al. | 345/158 |
| 6,476,799 B1 | * | 11/2002 | Lee et al. | 345/174 |

* cited by examiner

*Primary Examiner*—Richard Hjerpe
*Assistant Examiner*—Jennifer T. Nguyen
(74) *Attorney, Agent, or Firm*—Harris Zimmerman

(57) ABSTRACT

A method and apparatus for transmitting power to active touch stimulating devices associated with a touch sensing apparatus. In this invention four methods of providing power supply to the touch-input device are presented. These methods are: EM induction transmission using a single loop antenna, EM induction transmission using a conductive layer, acoustic transmission through air, and acoustic transmission through an acoustic conductive layer.

5 Claims, 2 Drawing Sheets

METHODS AND APPARATUS FOR SUPPLYING POWER TO TOUCH INPUT DEVICES IN A TOUCH SENSING SYSTEM

REFERENCE TO RELATED APPLICATION

This application is a continuation-in-part of application Ser. No. 09/670,610, filed Sep. 26, 2000, for which priority is claimed.

BACKGROUND OF THE INVENTION

Generally speaking a touch-sensing system, including a digitizer, writing panel, etc, consists of two major parts, namely the touch-sensing tablet and the touch-input devices. The touch-input devices, such as a pen, a stylus, a human finger, a mouse, etc, are used to introduce the touch events. The touch-sensing surface is used to sense the relative position of the touch-input devices on its surface.

A touch-input device can be classified as an active device or a passive device according to whether it emits an excitation signal for the touch-sensing tablet to detect its position. For an active device that emits an excitation signal, a circuit to generate this signal and a method of supplying power to this circuit are needed.

Typical methods in current touch-screen technologies to supply power to the touch-input devices include using a battery, using Electromagnetic (EM) induction, and Infrared induction, etc. To supply power to the touch-input device through EM induction, the touch-sensing tablet first generates an EM field across its sensing surface to establish an energy field. When a touch-input device is placed within this EM field, its couples the energy of this EM field through a coil antenna and feeds this energy into an electrical power supply for its active circuit.

In U.S. Pat. Nos. 5,693,914, 5,594,215, and other similar patents, power supply methods incorporating EM induction in touch systems used as digitizers are disclosed. The touch systems use a 2-D antenna array to introduce the EM field onto the touch-sensing surface. This 2-D array consists of a rectangular loop antennae placed with a given interval in both X and Y directions of the touch sensing surface. In some patent disclosures some power control methods are introduced so that the loop antennae that are closest to the touch-input device are given maximum power, so that the resulting EM field distributes maximum energy to the space near the touch-input device.

This antenna configuration has many drawbacks, one of them being that these loop antennae must be placed underneath the touch-sensing surface so that enough power of the energy field can be introduced to the device. This placement may pose a significant problem in a computer touch screen application, where combining the screen surface and the loop antenna array together is a difficult engineering problem. And it is impossible for this touch-sensing assembly to be built separately, as most touch-screen assemblies are manufactured currently, and integrated with the existing computer systems.

Another drawback is that, as multiple loop antennae are used to generate the EM field, EM fields from these loop antennae could interfere with each other, providing a resulting EM field with poor uniformity and poor directivity. When the touch-input device is expected to couple with this EM field using its coil antenna with strong directivity, the coupling result may be degraded.

SUMMARY OF THE INVENTION

The present invention generally comprises a method and apparatus for transmitting power to active touch stimulating devices associated with a touch sensing apparatus. In this invention four methods of providing power supply to the touch-input device are presented. These methods are
 1) EM induction transmission using a single loop antenna,
 2) EM induction transmission using a conductive layer,
 3) Acoustic transmission through air,
 4) Acoustic transmission through an acoustic conductive layer.

These methods as a whole can generally be regarded as transmitting power to the device using an energy conducting wave field through a specific propagating medium.

Method 1:

In this method a single loop antenna is provided in combination with the touch-sensing apparatus to generate the EM field. This loop antenna is placed on the boundary of the touch-sensing surface or area, such as a computer screen, a writing pad, the surface of a digitizer, etc. Using this loop antenna, the touch system generates an EM field that is distributed across the touch-sensing surface. A touch-input device, placed within the boundary of the touch sensing surface, receives power by coupling this EM field using a coil antenna built into the touch input device.

It should be mentioned that as the area of coverage of the loop antenna in this invention is larger than a typical loop antenna described in the patent disclosures mentioned above, a touch-input device in this invention may couple less energy than the prior art arrangements. However, in a co-pending patent application Ser. No. 09/877,611, filed Jun. 8, 2001, methods of using spread spectrum technology have been disclosed. These methods enable a touch-input device to consume power in the order of tens of micro-watts, rather than the hundreds of micro-watts or milli-watts of power used by touch-input devices without spread spectrum technology.

Method 2:

In this method the touch-sensing area is covered by a conductive layer. This conductive layer may be transparent like those used in computer touch screens of the capacitive type. The conductive layer may be regarded as a distributed resistor in planar form. There are also transmitters placed at the boundary of this conductive layer. These transmitters introduce an EM field propagating through this layer. This EM field is an AC field transmitted through the distributed resistance of the conductive layer whereby, for any two points on the conductive layer, there is a voltage differential between these two points.

When the EM field is established on the conductive layer, a touch-sensing device obtains power by taking the voltage between two pickup points. These two pickup points are conductive structures of the device itself, adapted to make contact with the conductive layer once the touch-input device is placed onto this layer, and wired to the power generating circuit to generate power supply to the touch-input device.

Method 3:

In this method the touch-sensing tablet generates an acoustic field across the touch-sensing surface or area, by using one or more acoustic transmitters. The touch-input device within this acoustic spatial field couples this acoustic energy field to an acoustic transducer and converts the acoustic vibration into electrical voltage. This transducer is termed an acoustic generator. The coupled voltage is then regulated by a circuit to provide power to the circuit of the touch-input device.

Method 4:

In this method the touch-sensing tablet is covered by an acoustic wave conducting layer. This conductive layer may be transparent like glass with good acoustic conductivity. Acoustic transmitters placed at the boundary of the touch-sensing tablet are used to generate an acoustic wave field, propagating through this acoustic conductive layer.

Touch-input devices placed on the layer include acoustic transducers, similar to the transducers mentioned in Method 3 above and contacted to the layer, to couple the acoustic energy and convert this energy into electrical power. This electrical power is regulated to provide power supply to the device circuit.

DESCRIPTION OF THE PREFERRED EMBODIMENT

The present invention generally comprises a method and apparatus for transmitting power to active touch stimulating devices associated with a touch sensing apparatus. The operation of the touch stimulating devices in communicating with the touch sensing apparatus is not described herein; rather, reference is made to companion application Ser. No. 09/877,611 for a full disclosure of these systems, which is incorporated herein by reference. In particular, attention is directed to FIGS. 7–16 and 25, and pp. 28–37 and 45–46 for descriptions of active touch stimulating devices that employ spread spectrum signal techniques to reduce requirements for operating power for these devices.

Figure 1:
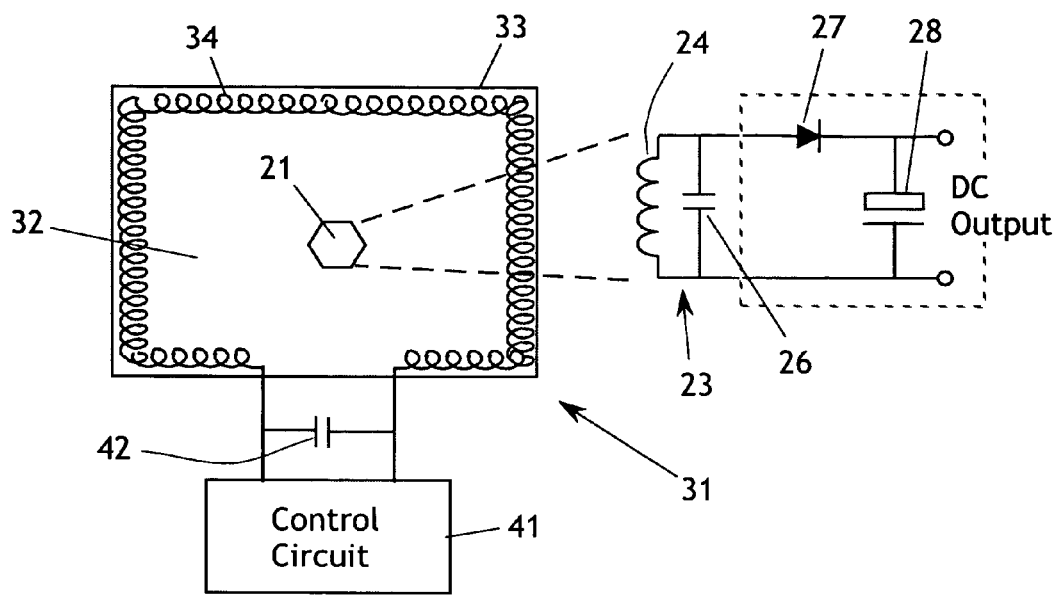
FIG. 1 is a schematic diagram of an EM spatial field embodiment of the invention for transmitting operating power to a touch stimulating device of a touch sensing system.

With regard to FIG. 1, a touch sensing system 31 includes an antenna 34 disposed at the periphery of the touch sensitive area 32, the antenna radiating EM energy at a frequency that is resonant with respect to the antennae of the active touch stimulating devices 23. The antenna 34 may comprise one or more turns of wire or conductor about the perimeter of the assembly 33, or any other configuration that is effective to localize the EM field to the touch sensitive area, and is tuned to the appropriate resonant frequency by use of a capacitor 42 connected in parallel therewith. The antenna 34 is powered by a control circuit 41. The antenna 34 transmits sufficient power to drive a plurality of active touch stimulating devices 21.

The apparatus of the invention includes at least one, and preferably a plurality of active touch stimulating devices 21. Each active touch stimulating device includes a resonant antenna 23, comprised of an inductor 24 and a capacitor 26 in parallel connection to form a resonant circuit having a frequency defined by the parallel LC time constant. The antenna 23 receives power transmitted at the resonant frequency, and feeds the power signal to diode 27 and capacitor 28 to generate regulated DC power to operate the active touch stimulating device electronics.

The antenna 24 may comprise a coil formed of a plurality of turns of wire or other conductor about an axis that is centered in the base or housing of the device. Alternatively, the antenna may comprise a helical or toroidal winding, or any other configuration about any sort of axis, providing that it is efficient at receiving the EM field from the system antenna 34. Also, these embodiments may include self-stick base arrangements so that any or all of these devices may be releasably secured to the screen assembly.

It is noted that in this embodiment antenna 34 transmits power through free space to the antennae 23 of one or more active touch stimulating devices 21. The touch detecting portion of the system 31 may or may not employ free space as the propagating medium for the signals transmitted from the active devices 21.

Figure 2:
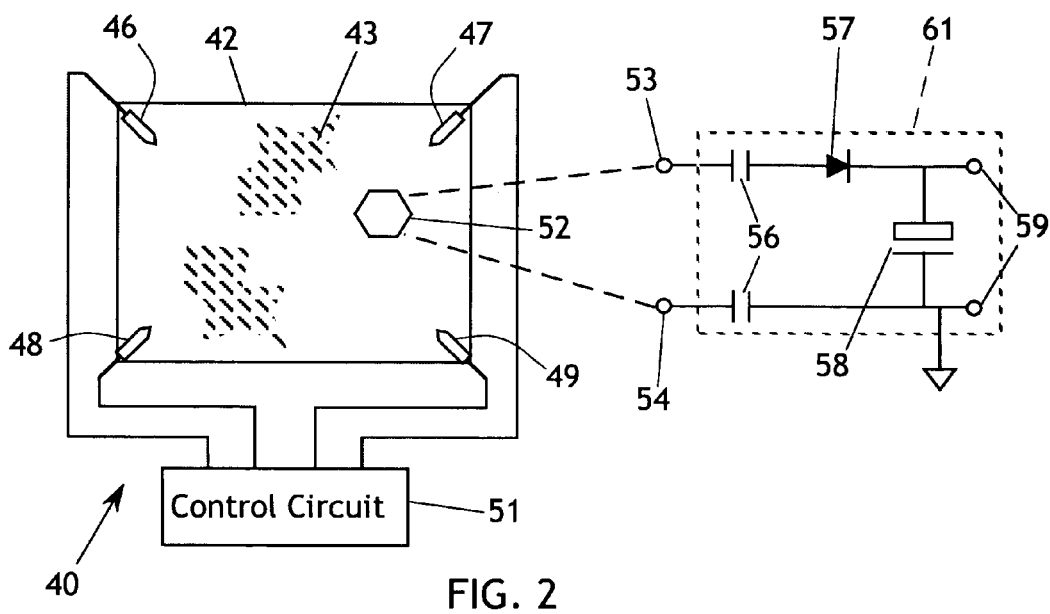
FIG. 2 is a schematic diagram of an EM conductor embodiment of the invention for transmitting operating power to a touch stimulating device of a touch sensing system.

With regard to FIG. 2, a further embodiment of the invention includes touch sensing system 40 that defines a touch sensing area 42. A conductive layer 43 (film, coating, sheath, plate, panel, or lamina) is disposed within the area 42, and may comprise a transparent layer associated with a machine-controlled display. A plurality of transmitters 46–49 are connected to the layer 43, and are disposed about the periphery thereof. One possible arrangement is a rectangular layer with 4 transmitters connected to the vertices of the rectangle, as shown in FIG. 2. The transmitters are operated by control circuit 51, and are driven by an AC power signal to introduce an EM field propagating through layer 43. The conductive layer comprises a distributed resistance extending in the plane of the layer 43, and the EM field propagating through the layer forms an AC voltage gradient that extends along the layer.

The system 40 includes at least one active touch stimulating device 52 that has a power supply 61 to operate the active touch signal generating circuit thereof. The power supply 61 includes a pair of contact points 53 and 54 extending from the device 52 to contact the conductive layer 43 at two points that are spaced apart on the surface of the conductive layer 43. Due to the spacing of the contacts 53 and 54, there is a differential in the voltage picked up by the contacts from the two dimensional distributed field in the layer 43. The contacts are connected to parallel capacitors 56, and diode 57 in series and capacitor 58 in parallel to generate regulated DC power at outputs 59 to power the active touch signal circuitry.

Thus whenever the device 52 is placed on the conductive layer 43 it receives operating power and is ready for use. Note that the touch detecting portion of the system 40 may or may not use the layer 43 as a propagating medium for touch activation signals from the device 52.

Figure 3:
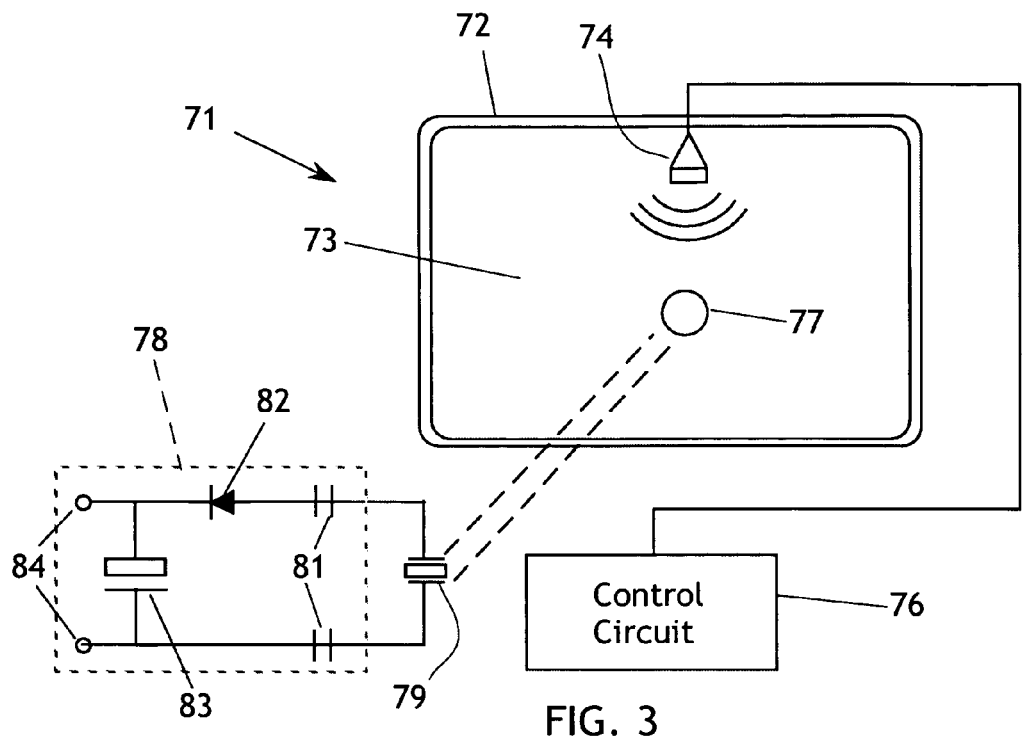
FIG. 3 is a schematic diagram of an acoustic layer embodiment of the invention for transmitting operating power to a touch stimulating device of a touch sensing system.

With regard to FIG. 3, another embodiment of the invention comprises a touch sensing system 71 having a touch sensing area 72. An acoustic transmitter 74 is directed to transmit acoustic energy through the propagating medium 73 (in this case, air) and form an acoustic spatial field within the area 72. The transmitter 74 is driven by a control circuit 76. The system includes at least one active touch stimulating device 77 that includes a power supply circuit 78. The circuit 78 includes an acoustic transducer 79 that receives energy from the acoustic spatial field and produces a voltage response, forming an acoustic generator. The voltage from transducer 79 is fed through parallel capacitors 81 to diode 82 in series and capacitor 83 in parallel to produce regulated DC power at outputs 84 for the active touch signal circuitry of the device 77.

Thus whenever the device 77 is placed within the medium 73 in the touch sensing area 72 it receives operating power and is ready for use. Note that the touch detecting portion of the system 71 may or may not use the air medium as a propagating medium for touch activation signals from the device 77.

Figure 4:
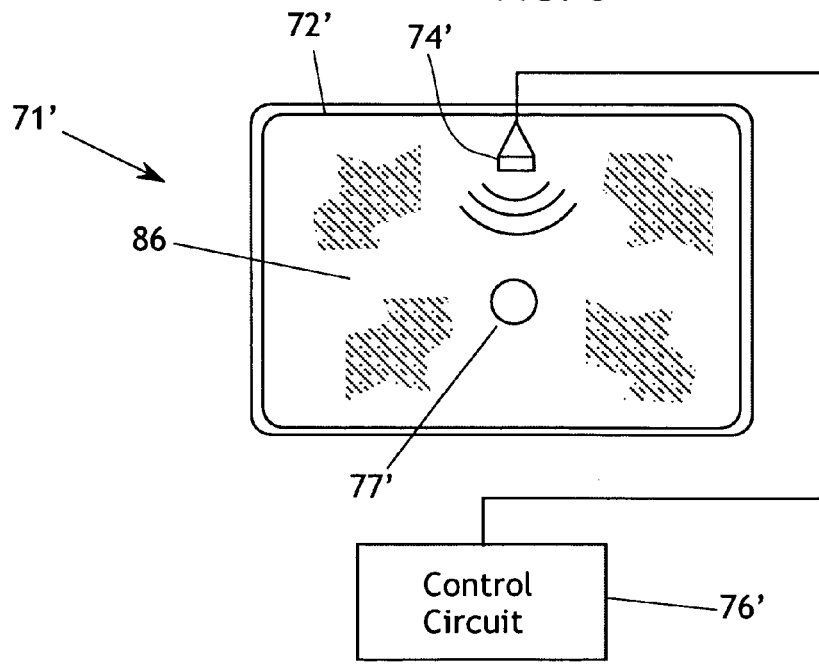
FIG. 4 is a schematic diagram of an acoustic layer embodiment of the invention for transmitting operating power to a touch stimulating device of a touch sensing system.

With regard to FIG. 4, there is shown a modification of the previous embodiment of FIG. 3, in which similar components are accorded the same reference numerals with a prime (') designation. Within the touch sensing area 72' there is disposed a layer 86 (film, coating, sheath, plate, panel, or lamina) that is formed of a material that conducts acoustic energy very well. For example, the conductive layer 86 may be formed of transparent glass, which has good acoustic conductivity. Acoustic transmitters placed at the boundary of the touch-sensing tablet are used to generate an acoustic wave field, propagating through this acoustic conductive layer. A single acoustic transmitter 74' may be used to generate the field, or, alternatively, a plurality of transmitters may be used, similar to the arrangement shown in FIG. 2. At least one active touch stimulating device 77' includes a power supply 78 as shown previously, with the acoustic transducer 79 being adapted to contact the layer 86 to receive acoustic energy therefrom.

Thus whenever the device 77' is placed in contact with the layer 86 in the touch sensing area 72' it receives operating power and is ready for use. Note that the touch sensing portion of the system 71 may or may not use the acoustic conducting layer 86 as a propagating medium for touch activation signals from the device 77'.

In all the embodiments shown herein, the touch sensing systems may be combined with a display output of a computer or any electrical apparatus. The embodiments using free space or air as a propagating medium for the power signal do not require any component placed between the display and the viewer, and the embodiments using a conductive layer (acoustic field or EM field) may use transparent layers applied, laminated, or closely adjacent to the screen of the display.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. In a touch sensing system for identifying at least one active touch stimulating device, an apparatus for powering the active touch stimulating device, comprising:

a touch sensing area in which said at least one active touch stimulating device operates;

a transducer operatively associated with said touch sensing area for transmitting a power signal to said at least one active touch stimulating devices;

a conductive layer disposed within said touch sensing area, said transducer including at least one power signal transmitter coupled to said conductive layer to generate an EM field in said conductive layer;

each of said active touch stimulating devices including means for receiving said power signal and converting said power signal to electrical operating power for said active touch stimulating device;

wherein said transducer includes at least one power signal transmitter coupled to peripheral portions of said conductive layer and controlled to establish an AC voltage gradient across said conductive layer;

said at least one touch stimulating device including a pair of contact points adapted to electrically engage said conductive layer, said pair of contact points being movable on said conductive layer and spaced apart to acquire a voltage differential from said voltage gradient in said conductive layer.

2. The apparatus for powering an active touch stimulating device of claim 1, further including rectifying means connected to said voltage differential to generate operating power for said active touch stimulating device.

3. The apparatus for powering an active touch stimulating device of claim 1, wherein said touch stimulating device includes touch signaling means incorporating spread spectrum signals.

4. In a touch sensing system for identifying at least one active touch stimulating device in a touch sensing area, a method for powering the active touch stimulating device, comprising:

providing a conductive layer said touch sensing area;

generating an EM field in said conductive layer, said EM field having a voltage gradient across said touch sensing area;

providing each of said active touch stimulating devices with means for receiving a power signal from said EM field and converting said power signal to electrical operating power for said active touch stimulating device;

providing said at least one touch stimulating device with a pair of contacts adapted to translate on said conductive layer and electrically engage said conductive layer and pick up a voltage differential from said EM field in said conductive layer.

5. The method for powering an active touch stimulating device of claim 4, further including the step of providing said at least one touch stimulating device with a rectifier for receiving said voltage differential and generating DC operating power.

\* \* \* \* \*